Figure 1:
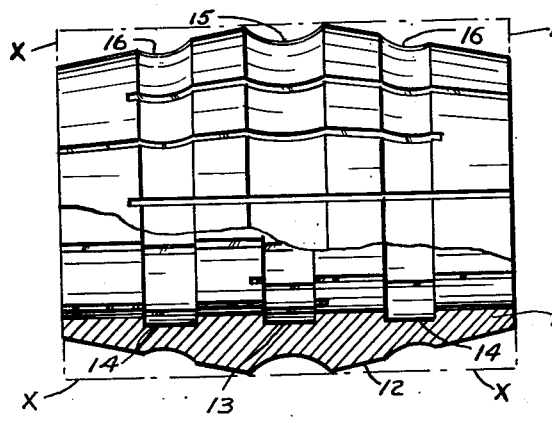

June 13, 1950  A. H. HEINRICH  2,511,260
BEARING
Filed Dec. 14, 1946

INVENTOR.
AUGUST H. HEINRICH
BY Bates, Teare & McBean
ATTORNEYS

Patented June 13, 1950

2,511,260

UNITED STATES PATENT OFFICE 2,511,260

BEARING

August H. Heinrich, Euclid, Ohio, assignor to Auto-Diesel Piston Ring Company, Cleveland, Ohio, a corporation of Ohio Application December 14, 1946, Serial No. 716,319

7 Claims. (Cl. 308—36.3)

This invention is concerned with a bearing adapted to form also a seal preventing the passage of fluid under pressure about a shaft or rod movably mounted in the bearing. The invention covers both the bearing itself and the method of making the same.

An object of the invention is to provide such a sealing bearing so arranged as to be able to replenish sealing material worn away by the friction of the movable member occupying the bearing. Another object is to provide for a ready adjustment of the bearing from time to time to maintain effective sealing action. Another object is to provide for the economical manufacture of the bearing.

The characteristics of the invention will be further explained in connection with the description of the preferred embodiment illustrated in the drawings.

Figure 2:
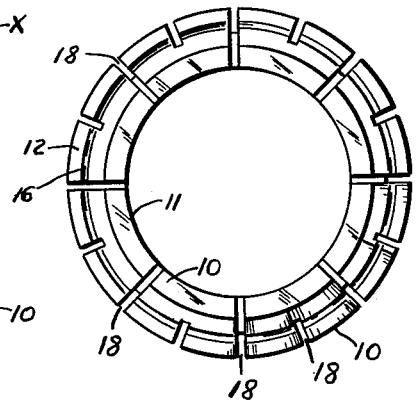
Figure 3:
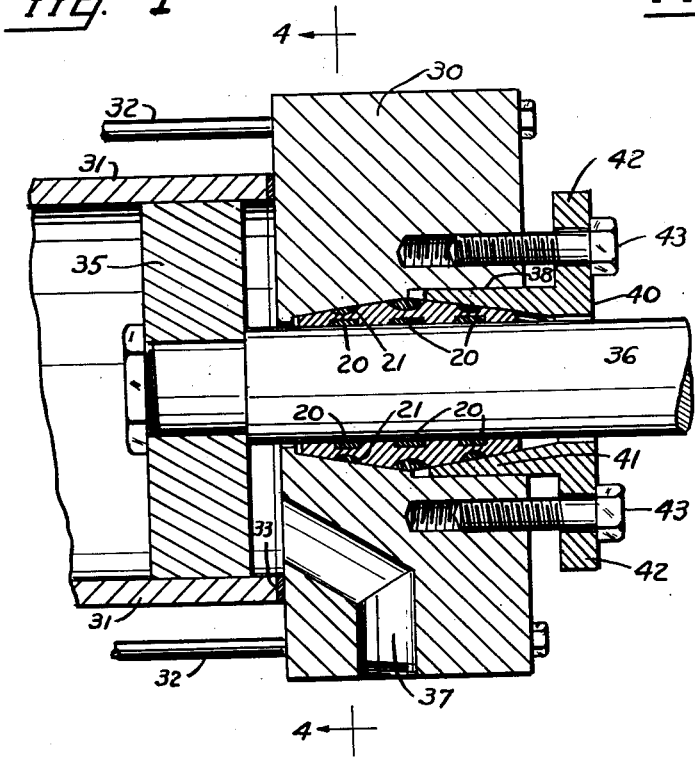
Figure 4:
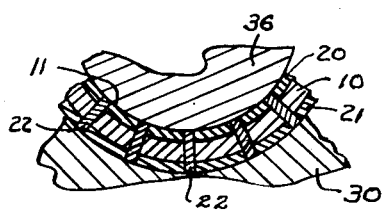

In the drawings, Fig. 1 is a side elevation, partly broken away and sectioned, of my sealing bearing; Fig. 2 is an end view thereof; Fig. 3 is an axial section illustrating the bearing mounted in place about a reciprocating piston rod; Fig. 4 is a fragmentary transverse section through the bearing, as indicated by the line 4—4 on Fig. 3.

In each of the figures, 10 indicates the body of my bearing. This is an open-ended barrel having a substantially cylindrical interior surface 11 and a double conical exterior 12. That is to say, the exterior surface flares from each end of the barrel toward the central region thereof. In the interior of the barrel, I provide a set of circumferential grooves, three being shown, one at the center and one on each side thereof, such grooves being designated 13, and 14, 14 respectively. Likewise, on the exterior of the barrel I provide a set of circumferential grooves three being shown, comprising a centrally located groove 15 and two extreme grooves 16, 16. Mounted in each of the grooves is sealing material forming a complete peripheral ring composed preferably of soft metal similar to babbitt. The interior rings 20 are cylindrical while the exterior ones 21 have their outer surface conical, the exposed surfaces of all of the rings thus conforming to those of the body.

The body of the barrel is longitudinally slotted by a series of equi-distant slots 18 which extend alternately from opposite ends of the barrel and terminate short of the other end. These longitudinal slots are filled with shims 22 of comparatively soft material similar to that in the circumferential grooves. As the slots extend entirely through the body wall, each shim is in communication with each of the annular rings of packing material on the interior and exterior of the barrel.

Fig. 3 shows such a bearing as described mounted in a recess in a cylinder head 30. This head is held in suitable manner tightly on the end of a cylinder 31. I have indicated by way of illustration through bolts 32 for this purpose, holding the head on against a gasket 33. Within the cylinder is a piston 35 secured to a piston rod 36 which extends outwardly through the bearing. A suitable passageway 37 through the cylinder head provides for the intake or discharge of fluid in the space between the piston and head, this showing being intended to be illustrative of any arrangement of passages.

The recess in the cylinder head 30 which the bearing occupies is formed in its inner portion as a frustum of a cone, so that the bearing may seat snugly in it. Then beyond such conical surface the recess is enlarged into a cylindrical portion 38 to receive a member for compressing the bearing.

The compressing member, as shown at 40, in Fig. 3, comprises a sleeve portion 41, having a conical interior and a cylindrical exterior and adapted to occupy the recess 38, and an annular head portion 42. Suitable means may engage the head portion to force it toward the cylinder head. For this purpose, I have indicated cap screws 43 passed through the head portion 42 and threaded into the cylinder head 30.

When the bearing is put in place in the cylinder head and the compressing member applied and its cap screws tightened the bearing becomes snugly seated in the conical portion of the recess and also within the conical portion of the compressing member. In such action the soft lining rings 20 make a tight seal on the piston rod while the soft external ring 21 nearest the cylinder 31 makes a tight seal with the cylinder head.

Now as the internal rings 20 become worn from the friction of the reciprocating piston rod such wear can be readily taken up by tightening the cap screws 43, which by pushing the clamping member inwardly along the conical surface of the bearing slightly contracts the bearing and squeezes the soft metal shims in the longitudinal slots so that some of the inner portion of these shims passes into the internal grooves 13 and 14 replenishing the supply of packing metal therein. Thus the bearing is caused to maintain a snug connection with the piston rod. At the same time the external packing metal 21 maintains a seal with the cylinder head.

It will be seen from the above description that my bearing not only seals, internally and externally, the rod or shaft and the cylinder head or other carrying member at the time of installation of the bearing, but that the provision of packing material in the longitudinal slots and the conical means for compressing the same provides for the replacement as necessary of worn packing material by the simple expedient of tightening the fastening screws and without the necessity of disassembling the parts.

I have provided a simple economical method for the manufacture of my improved bearing, as follows:

I take a comparatively thick-walled sleeve of proper material, for instance, brass, for the body of the bearing, such sleeve being cylindrical on the interior and also on the exterior, such original exterior surface being indicated by the broken lines X in Fig. 1. I slot this sleeve by saw cuts from one end of the sleeve passing nearly to the opposite end to provide half of the slots. Then from the opposite end I make saw cuts leading almost to the other end and located midway between the successive slots from the first-mentioned end. There are an even number of these slots so that individual slots from either end are each diametrically opposite another similar slot, thus providing for the diametric sawing of the sleeve to provide two slots at one operation.

Following the slotting of the original sleeve I mount in each of the slots a shim of soft packing metal such as babbitt, such shim snugly fitting the slot. I then machine off the exterior of the body and shims to produce the double conical shape. Then I form the external grooves mentioned and the grooves for the interior packing. After the circumferential grooves have been made I mount the babbitt or other soft packing material in all of the grooves.

I claim:

1. A bearing comprising a longitudinally slotted sleeve, packing material in the longitudinal slots, a circumferential groove in the bearing, packing material in said groove in communication with the material in the slots, and means for compressing the sleeve to cause the material in the slots to replenish the circumferential packing material.

2. A bearing comprising a longitudinally slotted sleeve, packing material in said longitudinal slots, a circumferential groove in the interior of the sleeve, packing material in the groove in communication with the material in the slots, and means for compressing the sleeve to cause the material in the slots to replenish the circumferential packing material.

3. In a bearing, the combination of an open-ended sleeve substantially cylindrical on the interior, said sleeve being slotted alternately from opposite ends by slots terminating short of the other end, shims of soft material in the slots, a circumferential groove in the sleeve and soft packing material in the circumferential groove contacting with the material in the slots.

4. In a bearing, the combination of an open-ended sleeve substantially cylindrical on the interior and having a conical exterior, said sleeve being longitudinally slotted by a plurality of parallel slots, shims of soft material in the slots, a circumferential groove in the interior of the sleeve and soft packing material in the circumferential grooves contacting with the material in the slots.

5. A bearing comprising a barrel flaring outwardly from opposite ends toward the center to produce two conical frustums, said barrel being longitudinally slotted alternately from opposite ends, a circumferential groove on the interior of the barrel, a circumferential groove on the exterior of the barrel, soft packing metal in the two circumferential grooves and also in the longitudinal slots, a conical socket formed to receive one of the conical portions of the barrel and a conical compressing member formed to act against the other portion of the barrel.

6. The combination with a rod to be packed of a tubular bearing therefor and a recessed member providing a seat for the bearing, said bearing comprising a barrel with a double conical exterior flaring from each end toward the central region, said seat being conical to receive one of the conical portions of the barrel, a packing member comprising a sleeve having a conical interior to coact with the other conical portion of the barrel, there being a head on said sleeve and means coacting with the head to force the sleeve into the member having the seat, said barrel being slotted alternately from opposite ends and being circumferentially grooved internally and externally, a soft metallic packing material in the slots and in the grooves, whereby the barrel may make a bearing for said rod and be sealed about the rod by reason of the internal packing material, and be sealed in said recessed member by reason of the external packing material, said material in the slots forming a reservoir of packing material adapted to replenish the circumferential material when the clamping member is tightened.

7. A bearing comprising a sleeve slotted longitudinally and having a circumferential groove in its surface, and shims of soft metal similar to babbitt in said slots and similar material in the groove whereby when the sleeve is compressed the material in the longitudinal slots will replenish that in the circumferential groove.

8. In a bearing, the combination of an open-ended sleeve substantially cylindrical on its interior, said sleeve being slotted alternately from opposite ends by slots terminating short of the other end, a circumferential groove in the interior of the sleeve communicating with the longitudinal slots and soft metal in the slots and groove whereby the material in the slots may replenish that in the groove when the sleeve is compressed.

AUGUST H. HEINRICH.

REFERENCES CITED

The following references are of record in the file of this patent:

UNITED STATES PATENTS

| Number | Name | Date |
|---|---|---|
| 403,808 | Weatherburn | May 21, 1889 |
| 558,236 | Thomas et al. | Apr. 14, 1896 |
| 1,995,548 | Mermigis | Mar. 26, 1935 |
| 2,012,826 | Montgomery | Aug. 27, 1935 |
| 2,289,703 | Goerke et al. | July 14, 1942 |
| 2,356,027 | Boyd et al. | Aug. 15, 1944 |
| 2,423,868 | Bishop | July 15, 1947 |